July 16, 1963 J. E. KING 3,097,466
APPARATUS AND METHOD OF CLEARING DITCHES
Filed July 20, 1959 2 Sheets-Sheet 1

INVENTOR
JACK E. KING

BY
ATTORNEYS

July 16, 1963  J. E. KING  3,097,466
APPARATUS AND METHOD OF CLEARING DITCHES
Filed July 20, 1959  2 Sheets-Sheet 2
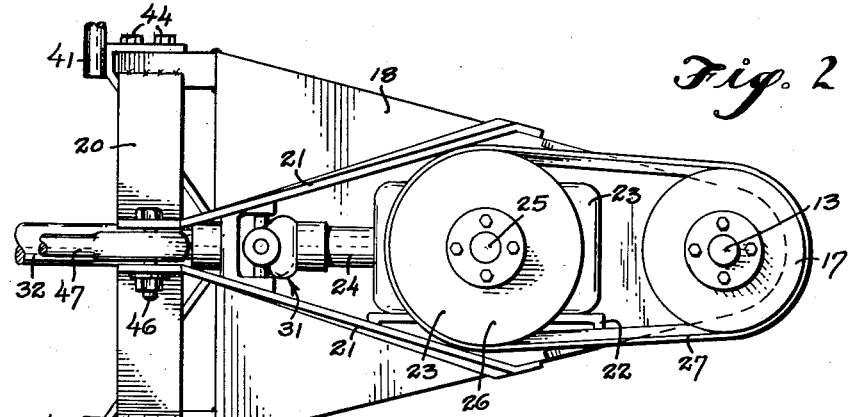
*Fig. 2*
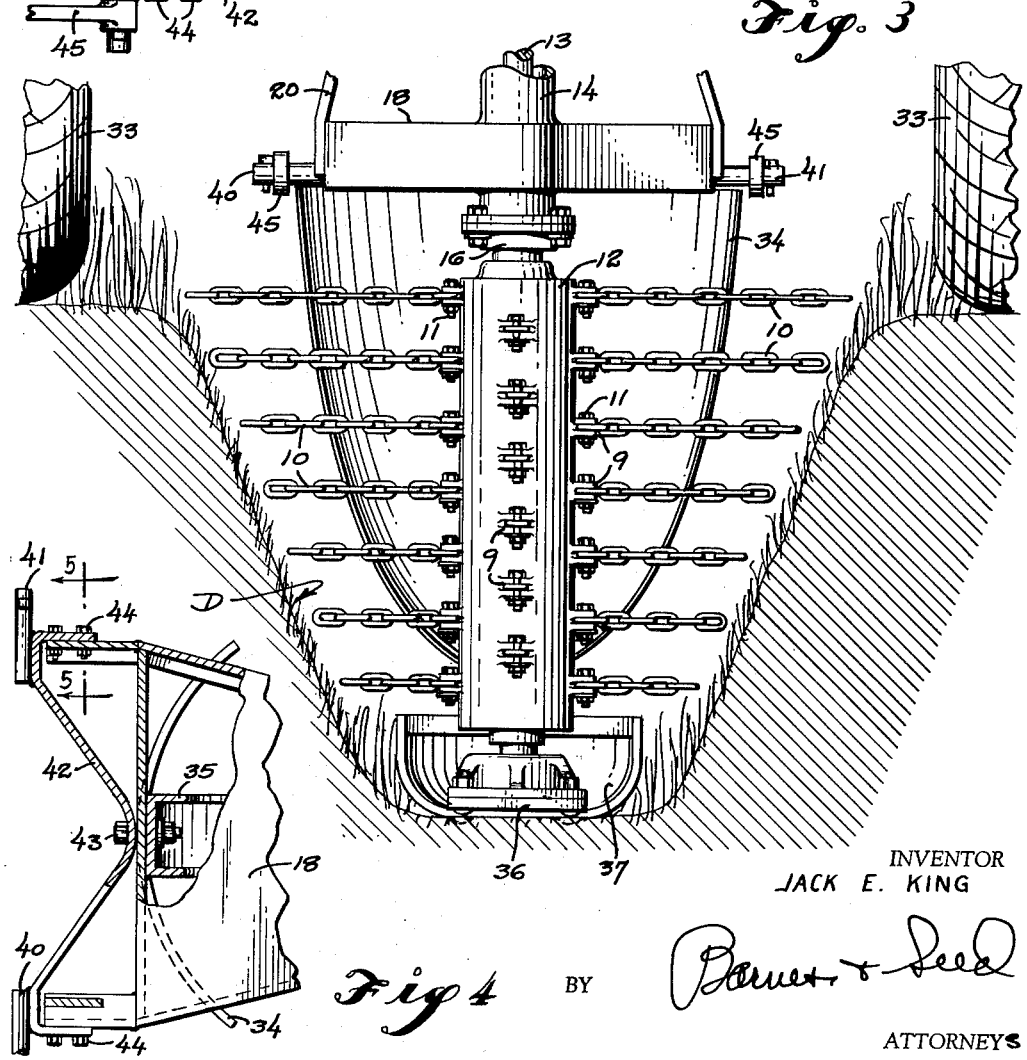
*Fig. 3*
*Fig. 4*
INVENTOR
JACK E. KING
BY
ATTORNEYS

United States Patent Office 3,097,466
Patented July 16, 1963

3,097,466
APPARATUS AND METHOD OF CLEARING DITCHES
Jack E. King, 312 W. 1st Ave., Toppenish, Wash.
Filed July 20, 1959, Ser. No. 828,245
12 Claims. (Cl. 56—25.4)

This invention pertains to a machine and method for clearing dirt irrigation ditches, and namely a machine and method for removing vegetation which roots itself in the floor and side walls of the ditch. This vegetation not only consumes and thus wastes quantities of water but ultimately would clog the ditch unless the growth is periodically removed.

The present invention, for its general object, aims to provide a perfected machine for the above purpose which is especially efficient in the performance of its intended function, one which is of simple and inexpensive construction, and which is unusually durable.

It is a further and more particular object to provide a ditch-clearing machine which admits of being trailed behind a conventional four-wheeled tractor and which performs its ditch-clearing action by rotation of a rotor powered off the auxiliary drive of the tractor.

As a further particular object the invention aims to provide a ditch-clearing machine of the described nature in which replaceable lengths of chain are carried by the rotor and by centrifugal action of the spinning rotor function as flails to strip the vegetation from the walls of the ditch.

With the above and still additional objects and advantages in view and which will each appear and be understood in the course of the following description and claims, the invention consists in the new method of clearing vegetation from dirt-walled ditches and in the novel construction, adaptation and combination of the parts of a machine for performing said method.

In the accompanying drawings:

FIG. 2 is a fragmentary top plan view thereof, deleting a showing of the flailing chains for simplicity in illustration.

FIG. 3 is a fragmentary rear elevational view with the flails shown in the positions which they would assume when extended by centrifugal force, and incorporating a fragmentary showing of the traction wheels of an associated tractor being driven along a ditch in process of being cleared by the machine.

FIG. 4 is a fragmentary horizontal sectional view on line 4—4 of FIG. 1; and

Figures 1, 5:
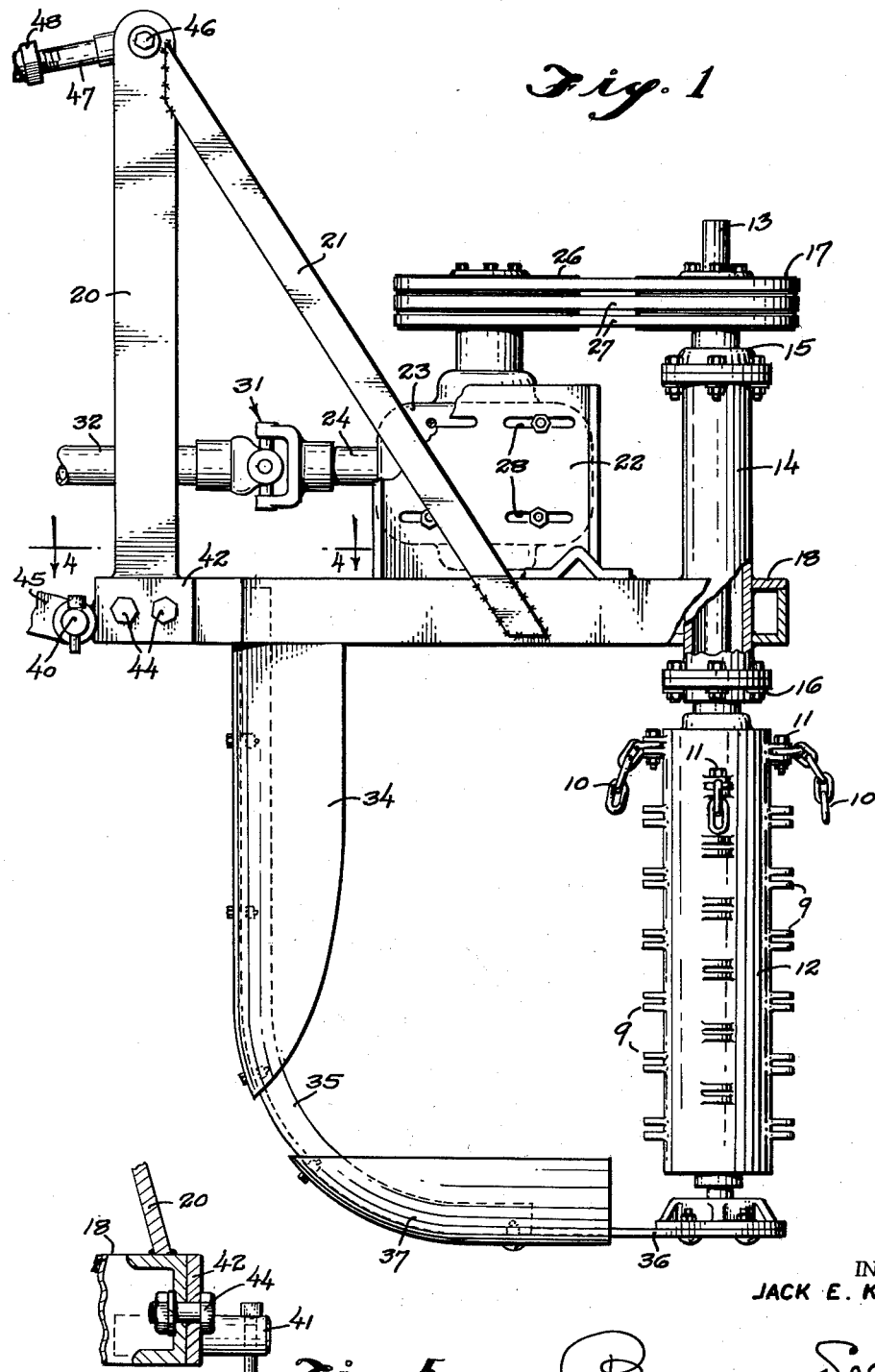
FIGURE 1 is a fragmentary side elevational view portraying a ditch-clearing machine constructed to embody the preferred teachings of the present invention.
FIG. 5 is a fragmentary transverse vertical sectional view on line 5—5 of FIG. 4.

Referring to said drawings, the flails of the present invention are designated by the numeral 10 and are desirably comprised of replaceable lengths of chain having one end attached by bolts 11 to lug-sets 9 presented upon the periphery of a cylindrical rotor 12 arranged to spin about a vertical axis. The lug-sets occur at equidistantly spaced intervals of the height of the rotor and desirably are paired so that two lug-sets are placed diametrically opposite one another at each level. I have illustrated the lug-sets as being staggered in a manner such that the lug-sets occupying alternate levels are disposed in one coinciding vertical plane while those occupying the intervening levels are disposed in a second traversing vertical plane normal to the first plane. The cross-sectional configuration of the particular ditch D which is to be cleared perforce dictates the length of the individual flails. Ditches conventionally have a V-shape in cross-section as shown in FIG. 3, wherefor the tips of the chain flails, when horizontally extended by centrifugal force in response to spinning of the rotor, outline or approximately outline the perimeter of an inverted truncated cone whose profile plane corresponds to but is moderately smaller than the cross-sectional profile of the ditch.

The rotor 12 is fixed upon the lower end of a shaft 13 having its upper end extending through the center of a hollow post 14. The shaft is given support by a thrust and journal bearing 15 at the top of the post and a journal bearing 16 at the bottom of the post. A multi-groove pulley 17 is fixedly mounted upon an exposed upper end of the shaft.

The post occupies an upstanding position at the rear end of a frame-work with which it is made a unitary part and which is or may be fabricated from angle, plate, and bar stock connected by weld joints. A deck 18 dominates such frame-work, and at the front end of the deck there is provided an upstanding A-frame 20 stiffened by braces 21. Between the A-frame and the post 14 the deck is integrally surmounted by a bracket 22 giving support to a gear case 23 driven by a horizontal input shaft 24 and driving a vertical output shaft 25. Said output shaft, more particularly, parallels the shaft 13 and drives a multi-groove pulley 26 passing power by companion belts 27 to the pulley 17, there being an acceleration in speed as between the drive pulley 26 and the driven pulley 17. The mounting bracket 22 presents adjustment slots 28 for taking up slack in the belts.

The input shaft 24 is a stub-shaft and connects by a universal joint 31 with a shaft 32. Said shaft comprises two telescoping sections connected by a spline, and the front end of the front section connects by a second universal joint (not shown) to the rearwardly pointing stubbed auxiliary drive shaft of a 4-wheeled tractor whose driving rear wheels are denoted by 33 in FIG. 3. Such auxiliary drive lies on the longitudinal median line of the tractor.

34 desgnates a guard apron which depends below the deck in a position to the front of the flailing chains 10. A bar 35 gives support to said apron. Such bar is bolted by its upper end to the deck and has its lower end stabilized by a foot extension 36 which is journaled on an end of the shaft 13 exposed below the rotor 12. A shoe 37 is carried by said bar 35 in a position below the horizontal working plane occupied by the lowermost pair of flailing chains and is adapted in the use of the machine to ride along the floor of a ditch which is being cleared.

The machine is attached to the tractor by three horizontal pivot connections, one at the upper end of the A-frame and the other two, one at one side and the other at the other side of the deck at the extreme front thereof. The two lower pivot pins are denoted by 40 and 41 and are welded to a cross-member 42 which is secured to the deck by a center bolt 43 and cheek bolts 44. The two pins 40 and 41 each engage the terminal eye of a respective one of two laterally spaced apart draft arms 45 provided by the tractor. These draft arms are standard equipment and while their attachment to the tractor is not shown the same is conventionally a pivot attachment so that the aft ends are free to swing vertically. Hydraulic jacks or other power means are provided for raising and lowering the draft arms at will. The upper pivot pin of the machine's 3-point attachment is denoted by 46 and an arm 47 extends therefrom to the tractor. Within the length of such arm 47 there is provided a turnbuckle 48, this turnbuckle being so adjusted that when the shoe 37 rests upon the floor of a ditch the rotary axis of the rotor 12 will be approximately perpendicular to said floor.

It is believed that the invention will have been clearly understood from the foregoing detailed description of my now-preferred illustrated embodiment. The tractor is driven along the ditch with its wheels spanning the same, the machine trailing behind, and as power is passed through the shaft-and-belt drive from the tractor's auxiliary take-off to the rotor, the flails clear the vegetation along the sides of the ditch. The rotor desirably is caused to spin at an approximate 1000 r.p.m. The length of chains selected for any given operation is of course determined by the cross-sectional configuration of the ditch, and should it be desired to remove well-bedded root growth it is generally necessary that the chains be longer than where only the exposed growth is to be removed. It is ordinarily desirable that the tips of the flailing chains be out of contact with the dirt banks, no more than skimming the same at maximum "throw."

It is my intention that no limitations be implied and that the hereto annexed claims be given a scope fully commensurate with the broadest interpretation to which the employed language admits.

What I claim is:

1. In combination with a conventional 4-wheeled tractor adapted to be driven along the banks of a ditch in spanning relation thereto, a ditch-clearing machine detachably associated with the tractor and supported thereby so as to occupy a position within the ditch in trailing relation to the tractor and presenting a rotor journal-mounted from the machine for rotation about an upright axis and having about its periphery lengths of flailing chains spaced apart both at intervals of the circumference and of the height of the rotor and acting by rotation of the rotor to clear vegetation from the walls of the ditch, and a detachable drive connection to said rotor from the engine of the tractor for driving the rotor.

2. In combination with a tractor adapted to be driven along the bank of a ditch, a ditch-clearing machine detachably supported by the tractor so as to occupy a position within the ditch and presenting a rotor having about its periphery multiple lengths of flailing chains acting by rotation of the rotor to clear vegetation from the walls of the ditch, and a detachable drive connection to said rotor from the engine of the tractor for driving the rotor.

3. Structure according to claim 1 in which the tip ends of said flailing chains, when extended by centrifugal action, have the substantial profile configuration of an inverted truncated cone so as generally to conform to the profile configuration of a ditch being cleared.

4. In combination with a tractor adapted to be driven along the bank of a ditch, a ditch-clearing machine supported by the tractor so as to occupy a position within the ditch and presenting a rotor journaled to turn about a vertical axis which approximately coincides with the longitudinal median line of the ditch and having multiple loosely hung flailing arms placed at spaced intervals of the height and arranged to be extended by centrifugal action upon rotation of the rotor, and means for driving said rotor, each of such arms having a sweep diameter approximately corresponding with the span across the ditch on the particular level occupied by the arm, means being provided for bodily adjusting the ditch-clearing machine vertically in relation to the tractor so as to raise and lower the same within the ditch.

5. In combination with a conventional 4-wheeled tractor adapted to be driven along the banks of a ditch in spanning relation thereto and having at its rear end a rearwardly pointing auxiliary drive together with a 3-point implement suspension comprising an upper centrally disposed point of suspension and two lower points of suspension located below said upper suspension point at opposite sides thereof, means being provided for raising and lowering said 3-point suspension at will, a ditch-clearing machine arranged to be trailed behind said tractor, said machine comprising: a frame having means for removably attaching the same to said three points of suspension, a rotor journal-mounted from the frame for rotation about a vertical axis, ditch-clearing flails carried by said rotor, and an operative interconnection from the auxiliary drive to the rotor for rotating said rotor.

6. Structure according to claim 5 in which the flails are comprised of lengths of chain removably attached to the rotor.

7. Structure according to claim 5 in which said drive connection includes a gear box supported by said frame and presenting a horizontal input shaft at the front and a vertical output shaft at the top with a direct shaft connection including universals from said auxiliary drive to the input shaft, and a belt connection from the output shaft to the rotor, said belt connection producing an increase in speed as between the output shaft and the rotor.

8. Structure according to claim 1 in which the ditch-clearing machine provides a main frame and has a guard apron suspended from the frame to occupy a position immediately to the front of the sweep limit of the rotating flails between said flails and the tractor.

9. Structure according to claim 8 having a shoe carried by the frame and arranged in the use of the machine to ride along the bottom of the ditch.

10. Structure according to claim 8 having an L-shaped bar suspended from the frame on the approximate longitudinal median line thereof with the vertical leg of said L lying to the front of the rotor beyond the sweep limit of the rotating flails and with the horizontal leg of the L lying below the flails and supported by its free end from the lower end of the rotor, a guard apron carried by said vertical leg, and a shoe carried by said horizontal leg, said shoe being adapted in the use of the machine to bear upon the floor of the ditch.

11. The method of clearing vegetation from the walls of a dirt irrigation ditch, comprising attaching multiple sections of chain to a vertical rotor at closely spaced intervals of the height and with the chain sections progressively increasing in lengths from the bottom to the top of the rotor so that, upon rotation of the rotor about a vertical axis, the centrifugally extended chain lengths have the profile configuration of an inverted truncated cone the bounding surface of which has an angularity approximating that to which the side walls of the ditch are sloped, placing said rotor with its attached chain lengths vertically within the ditch and rotating the same at a fast speed while giving bodily travel thereto along the length of the ditch and coincidentally raising or lowering the rotor as may be necessary to dispose the tip ends of the extended chains in close proximity to the walls of the ditch.

12. The method of clearing vegetation from the walls of a dirt irrigation ditch, which comprises placing within the ditch an upright rotor to which chain flails are attached both at intervals of the height and at intervals of the circumference, and rotating the rotor at a fast speed while giving bodily travel thereto along the length of the ditch.

References Cited in the file of this patent
UNITED STATES PATENTS

| | | |
|---|---|---|
| 2,029,858 | Couch | Feb. 4, 1936 |
| 2,139,310 | Marchek | Dec. 6, 1938 |
| 2,493,261 | Porter et al. | Jan. 3, 1950 |
| 2,504,365 | Wallace | Apr. 18, 1950 |
| 2,648,940 | Merkley et al. | Aug. 18, 1953 |
| 2,676,448 | Limberger | Apr. 27, 1954 |
| 2,677,926 | Washbourne et al. | May 11, 1954 |